(12) United States Patent
Johnson

(10) Patent No.: US 10,641,472 B1
(45) Date of Patent: May 5, 2020

(54) HYBRID LASER/LED MODULAR LIGHT SOURCE WITH ENHANCED DIRECTIONAL ILLUMINATION

(71) Applicant: Bestop Baja, LLC, San Marcos, CA (US)

(72) Inventor: Christopher Johnson, San Marcos, CA (US)

(73) Assignee: Bestop Baja, LLC, San Marcos, CA (US)

( * ) Notice: Subject to any disclaimer, the term of this patent is extended or adjusted under 35 U.S.C. 154(b) by 0 days.

(21) Appl. No.: 16/664,759

(22) Filed: Oct. 25, 2019

Related U.S. Application Data

(60) Provisional application No. 62/750,607, filed on Oct. 25, 2018.

(51) Int. Cl.
| | |
|---|---|
| *F21V 21/30* | (2006.01) |
| *F21S 41/20* | (2018.01) |
| *F21S 41/143* | (2018.01) |
| *F21S 41/50* | (2018.01) |
| *F21S 41/14* | (2018.01) |
| *F21S 41/151* | (2018.01) |
| *F21S 41/16* | (2018.01) |
| *F21V 3/02* | (2006.01) |
| *F21V 15/01* | (2006.01) |
| *F21V 31/00* | (2006.01) |
| *F21S 41/32* | (2018.01) |
| *F21Y 115/10* | (2016.01) |
| *F21Y 115/30* | (2016.01) |
| *F21V 7/00* | (2006.01) |
| *F21V 7/06* | (2006.01) |
| *F21S 45/50* | (2018.01) |

(52) U.S. Cl.
CPC ............ *F21V 21/30* (2013.01); *F21S 41/143* (2018.01); *F21S 41/151* (2018.01); *F21S 41/16* (2018.01); *F21S 41/18* (2018.01); *F21S 41/28* (2018.01); *F21S 41/50* (2018.01); *F21V 3/02* (2013.01); *F21V 15/013* (2013.01); *F21S 41/321* (2018.01); *F21S 41/322* (2018.01); *F21S 45/50* (2018.01); *F21V 7/0091* (2013.01); *F21V 7/06* (2013.01); *F21V 31/005* (2013.01); *F21Y 2115/10* (2016.08); *F21Y 2115/30* (2016.08)

(58) Field of Classification Search
CPC ........ F21V 21/30; F21V 21/10; F21V 21/108; F21V 21/116; F21V 7/06; F21V 7/0091; F21V 15/013
See application file for complete search history.

(56) References Cited

U.S. PATENT DOCUMENTS 8,021,024 B2 *  9/2011 Huang ................. F21V 15/013
  362/294
9,739,462 B2 *  8/2017 Georgitsis .............. F21V 21/14
9,800,017 B1  10/2017 Raring et al.
(Continued)

*Primary Examiner* — William N Harris
(74) *Attorney, Agent, or Firm* — Lowe Graham Jones PLLC

(57) ABSTRACT

An improved vehicle light apparatus including an auxiliary light having a housing defining a front opening extending in a horizontal direction and a vertical direction perpendicular to the horizontal direction. A light emitting device is mounted in the housing. A transparent cover is mounted over the front opening. A rib extends rearwardly from the housing opposite the front opening and a plurality of fins are mounted on the rib.

18 Claims, 8 Drawing Sheets

(56) References Cited

U.S. PATENT DOCUMENTS

| | | | |
|---|---|---|---|
| 9,835,296 B2 | 12/2017 | Goutain et al. | |
| 10,050,415 B1 | 8/2018 | Raring et al. | |
| 10,084,281 B1 | 9/2018 | Raring et al. | |
| 2010/0254148 A1* | 10/2010 | Huang | F21V 15/013 362/373 |
| 2010/0328945 A1* | 12/2010 | Song | F21V 15/013 362/240 |
| 2011/0002120 A1* | 1/2011 | Song | F21S 2/005 362/249.02 |
| 2011/0211330 A1* | 9/2011 | Wang | F21V 3/00 362/20 |
| 2012/0106152 A1* | 5/2012 | Zheng | F21V 21/30 362/249.02 |
| 2012/0218757 A1* | 8/2012 | Gill | F21V 15/015 362/235 |
| 2013/0271977 A1* | 10/2013 | Ronen | F21V 15/013 362/235 |
| 2014/0078762 A1* | 3/2014 | Adams | F21V 21/30 362/496 |
| 2014/0146544 A1* | 5/2014 | Gebhard | F21V 5/007 362/311.02 |
| 2018/0022268 A1* | 1/2018 | Xie | B60Q 1/0483 362/487 |

\* cited by examiner

HYBRID LASER/LED MODULAR LIGHT SOURCE WITH ENHANCED DIRECTIONAL ILLUMINATION

PRIORITY CLAIM

This application claims priority to U.S. Provisional Application Ser. No. 62/750,607 filed Oct. 25, 2018, and entitled HYBRID LASER/LED MODULAR LIGHT SOURCE WITH ENHANCED DIRECTIONAL ILLUMINATION, which is incorporated by reference in its entirety.

FIELD OF THE INVENTION

This invention relates to portable lighting components that may be attached to on and off road vehicles, motorcycles, all terrain and utility vehicles, boats, and equipment.

BACKGROUND OF THE INVENTION

In many off-road and recreational vehicular activities, it is desirable to provide additional lighting. For example, an additional lighting apparatus may be used to project light forward or around a vehicle such as motorcycles, boats, utility vehicles, aircraft, construction and other equipment to increase operator visibility.

Adding additional light sources to achieve a desired short or long-distance illumination would in many applications exceed the space available or power capacity of the vehicle or equipment's capabilities. Recent developments in lighting sources including Light Emitting Diodes ("LED") and laser/phosphorus or gallium white light emitters, which permit greatly improved directional and surrounding illumination given the same amount of available space and electrical power without extensive or expensive modifications to the vehicle or its electrical systems.

In view of the foregoing, the present invention is directed to improving the function and utility of auxiliary lighting for a vehicle.

SUMMARY OF THE INVENTION

In one aspect of the invention, an apparatus includes an auxiliary light having a housing defining a front opening extending in a horizontal direction and a vertical direction perpendicular to the horizontal direction. A light emitting device is mounted in the housing. A transparent cover is mounted over the front opening. A rib extends rearwardly from the housing opposite the front opening and a plurality of fins are mounted on the rib.

In some embodiments, the rib is oriented substantially parallel to the horizontal direction and a longitudinal direction parallel to the horizontal direction. The plurality of fins may mount to rib extending along the rib substantially parallel to the horizontal direction. The plurality of fins may be angled and extend away from the housing with distance from the rib in a plane parallel to the horizontal direction and a vertical direction perpendicular to the horizontal direction and the longitudinal direction. The plurality of fins may include first fins positioned on a first side of the rib and second fins positioned on a second side of the rib. The housing may further include third fins positioned on a top of the housing and fourth fins positioned on a bottom of the housing.

In some embodiments, the apparatus further includes a mount having a first arm pivotally secured to a first pivot on a first side of the housing and a second arm pivotally secured to a second pivot on a second side of the housing opposite the first side, the first pivot and the second pivot defining an axis of rotation substantially parallel to the horizontal direction. In some embodiments there are a first extension on the first arm and extending rearwardly from the first arm and a second extension on the second arm and extending rearwardly from the second arm. A distal end of the first arm may be selectively securable to a distal end of the rib at a plurality of orientations of the rib. A distal end of the second arm may be selectively securable to the distal end of the rib at the plurality of orientations of the rib.

In some embodiments, the distal end of the first arm defines a first arcuate slot and the distal end of the second arm defines a second arcuate slot. A first protuberance may extend from the first side of the housing and into the first arcuate slot and a second protuberance extends from the second side of the housing and into the second arcuate slot. In some embodiments, the first side defines a first opening extending along the rib and the plurality of fins and the second side defines a second opening extending along the rib and the plurality of fins. The first extension may define a third opening overlapping the first opening and the second extension may define a fourth opening overlapping the second opening.

In some embodiments, the auxiliary light includes a plurality of light emitters distributed along the horizontal direction, the light emitting device being one of the plurality of light emitters. The plurality of light emitters may include one or more lasers and one or more light emitting diodes.

A transparent cover may be positioned over the front opening and extend across all of the plurality of light emitters in the horizontal direction. The transparent cover may contain regions with different optical properties positioned over different light emitters of the plurality of light emitters along the horizontal direction. The different optical properties may include different degrees of spreading of light from the different light emitters.

In some embodiments, a bezel is secured to the housing, the transparent cover being positioned between the bezel and the housing.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
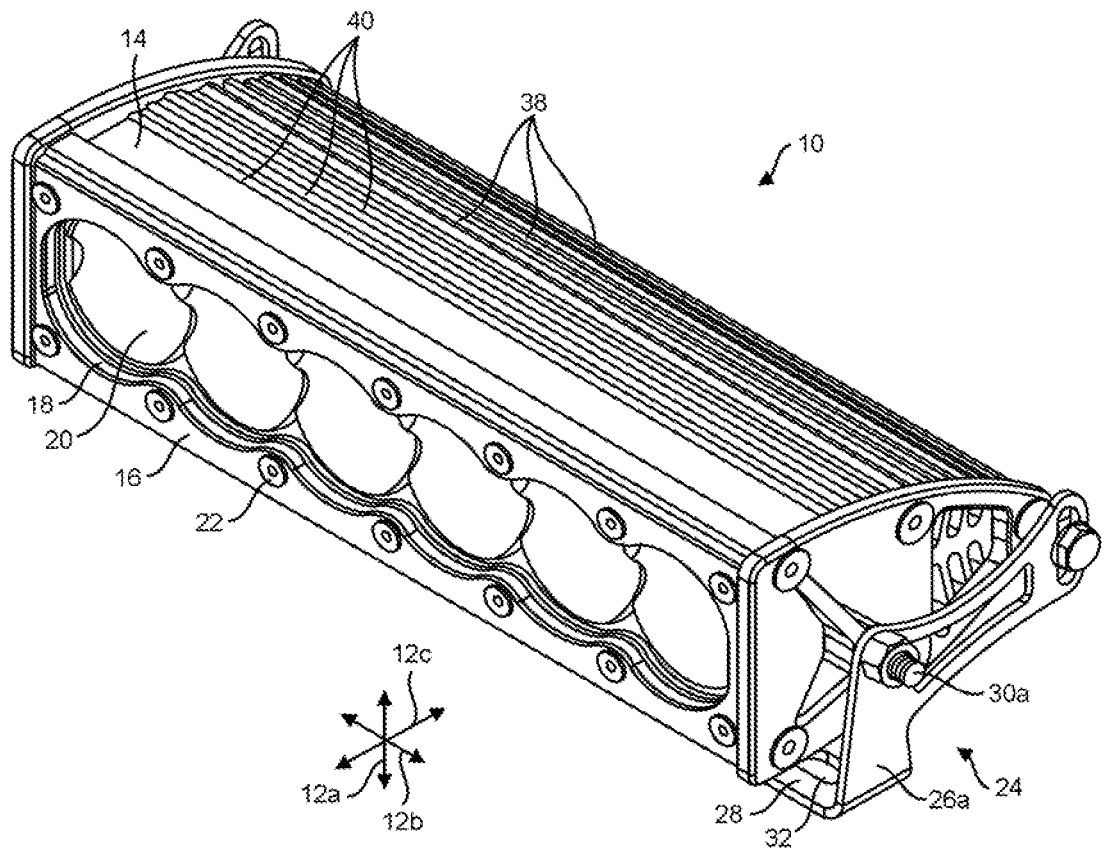
FIG. 1 is an isometric view of an auxiliary light in accordance with an embodiment of the present invention.
Figure 2:
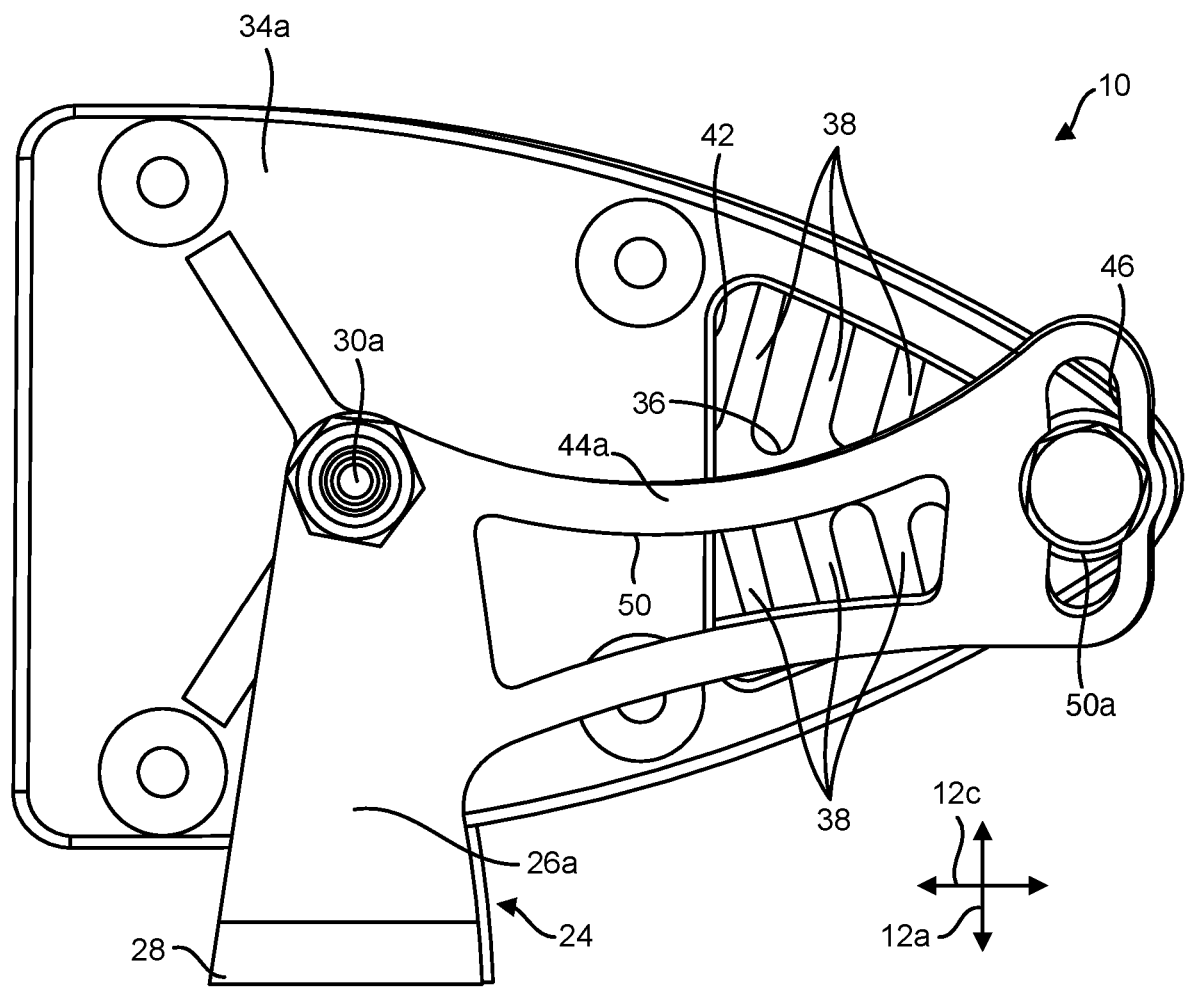
FIG. 2 is a left side view of the auxiliary light of FIG. 1.
Figure 3:
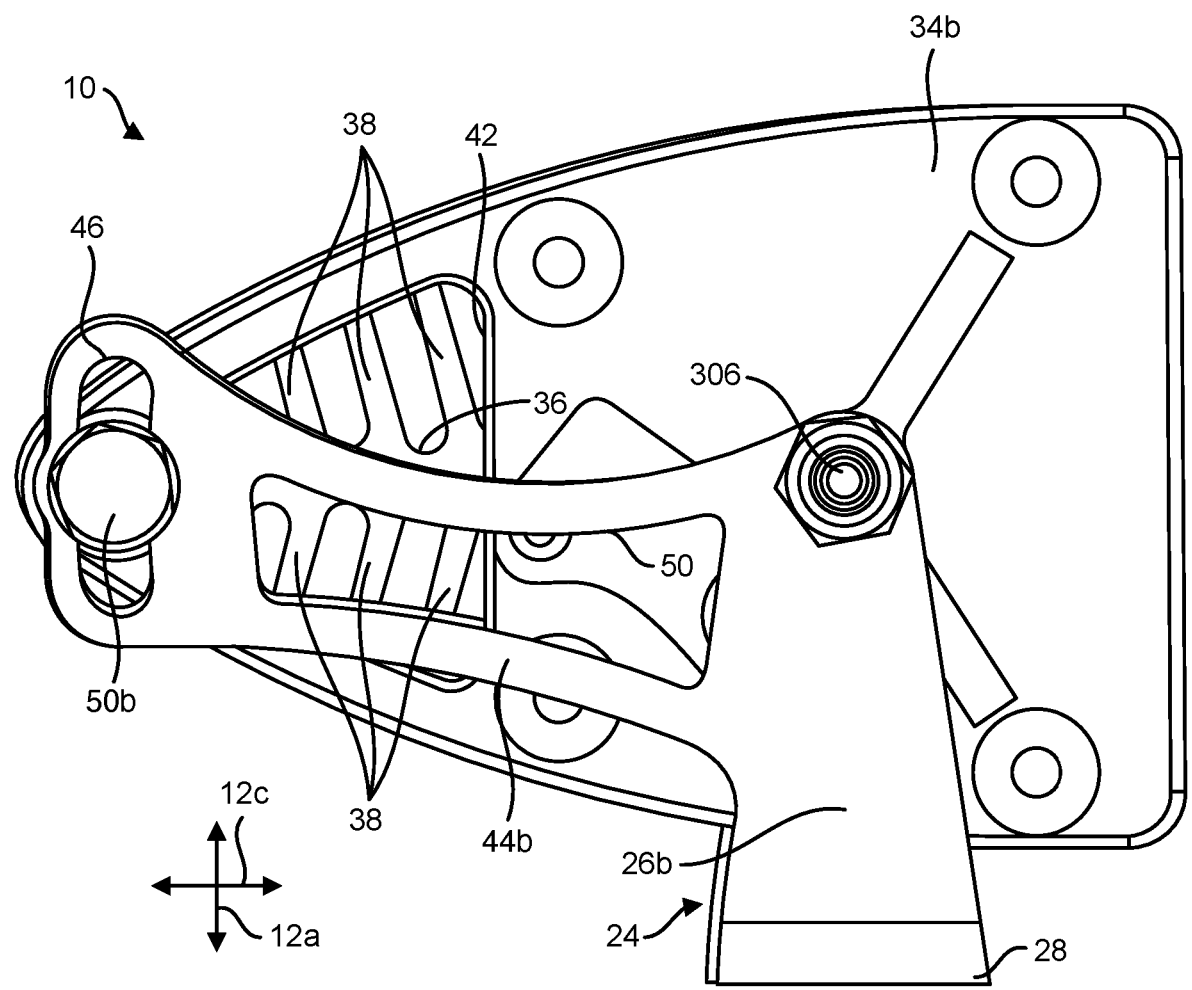
FIG. 3 is a right side view of the auxiliary light of FIG. 1.
Figure 4:
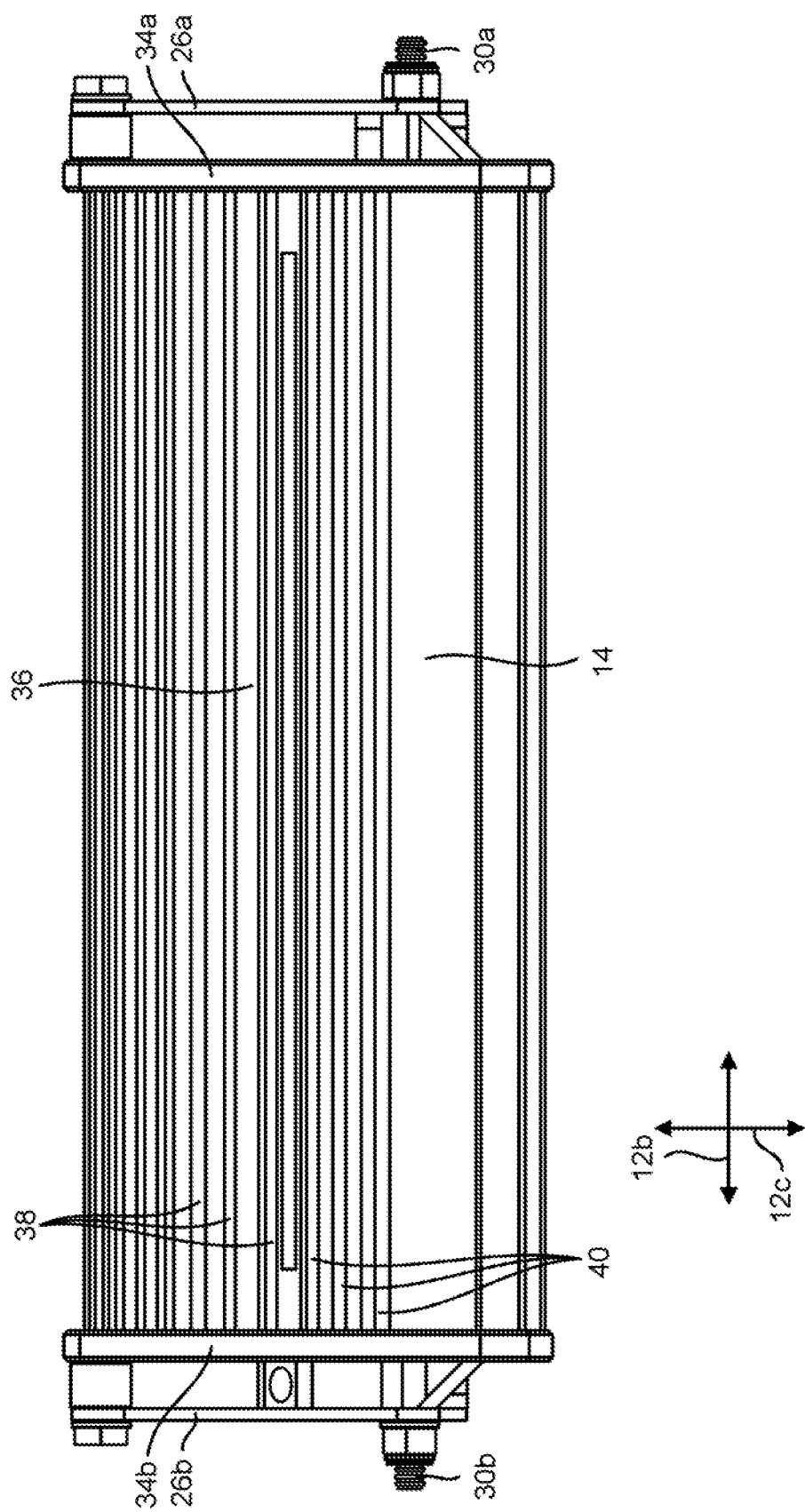
FIG. 4 is a top side view of the auxiliary light of FIG. 1.

Referring to FIGS. 1-4, an auxiliary light 10 as described herein may be understood with respect to a vertical direction 12a, a horizontal direction 12b and a longitudinal direction 12c that are all mutually perpendicular. These directions are defined to enable an understanding of the relative orientation and position of portions of the invention but need not correspond to global vertical, horizontal, and longitudinal directions when in use.

An auxiliary light 10 may be used in various applications such as secured to a vehicle such as a four-wheeled road or off-road vehicle, bicycle, motorcycle, boat, or any other type of vehicle. The light may also be secured to other articles, such as a helmet of a driver of a vehicle. The auxiliary light 10 may also be secured to a fixed structure rather than a vehicle.

The light 10 includes a housing 14 defining an opening at its front that is covered by a front bezel 16 defining an opening 18. The opening 18 may be covered by a transparent layer 20 that may be transparent plastic or glass. The transparent layer 20 may also function as a lens to focus or diffuse light. The transparent layer 20 may be textured or contoured in order to diffuse light passing therethrough. In the illustrated embodiment, the transparent layer 20 is substantially (e.g., within 5 degrees of) parallel to a vertical-horizontal plane parallel to the vertical direction 12a and horizontal direction 12b. A front surface of the bezel 16 and the front of the housing 14 that engages the bezel 16 may also be substantially parallel to the vertical-horizontal plane.

In the illustrated embodiment, the bezel 16 secures to the front of the housing 14 having the transparent layer 20 captured between itself and the perimeter of the front of the housing 14 hereby securing the transparent layer 20 to the housing 14. For example, fasteners such as screws 22 may pass through the bezel 16, or both the bezel 16 and the transparent layer, and engage corresponding threaded openings defined by the housing 14. The screws 22 may be any type of screw known in the art and may preferably have flat heads that are substantially flush with the front surface of the bezel 16 to avoid catching on anything or accumulating debris. The configuration of the housing 14, bezel 16, and transparent layer 20 may be such that the interior of the housing 14 is watertight. The use of seals (gaskets, O-rings, etc.) between any two of the housing 14, bezel 16, and transparent layer 20 may be used to provide sealing.

The light 10 may be secured to a vehicle or other structure by means of a mount 24. The mount 24 may be embodied as a bracket including a left arm 26a, a right arm 26b and a cross piece 28 extending between the arms 26a, 26b. The arms 26a, 26b and cross piece 28 may be a single member having end portions bent upward relative to the cross piece 28 to form the arms 26a, 26b. The arms 26a, 26b may be bent such that they are substantially perpendicular to the cross piece 28.

The left arm 26a may be attached to a left pivot 30a on a left side of the housing 14 and the right arm 26b may be attached to a right pivot 30b (shown in FIG. 3) on a right side of the housing 14. For example, the arms 26a, 26b may define apertures through which pivots 30a, 30b (e.g., bolts) pass and engage the housing 14. The cross piece 28 may define apertures 32 that may receive a fastener (e.g., bolt) for securing the mount 24 to a vehicle or other structure. The axis of rotation of the pivots 30a, 30b may be substantially (within 1 to 5 mm) at the center of gravity of the light 10 along the longitudinal direction 12c and may also be substantially at the center of gravity of the light 10 along the vertical direction 12a.

In the illustrated embodiment, side plates 34a, 34b secure on either side of the housing 14. For example, the housing may be a C-shaped or concave structure having a constant cross section perpendicular to the horizontal direction 12a along most, e.g., at least 80 percent, of its length parallel to the horizontal direction 12b, such as due to being extruded.

The plates 34a, 34b may secure to left and right sides, respectively, of the housing 14, such as by means of screws or other fasteners. As is apparent, the side plates 34a, 34b may have planar outer surfaces that are substantially parallel to the vertical and longitudinal directions 12a, 12c, with some rounding or chamfering on the edges. Note further that ribs or other features may be provided to provide clearance and stiffness for mounting of the pivots 30a, 30b. As is apparent in FIG. 1, the side plates 34a, 34b extend outwardly around the housing 14 and may reduce or prevent contact with sharp edges of the housing 14, particularly of fins formed thereon as discussed below. The side plates 34a, 34b may also have a straight front edge that extend slightly (e.g., 1 to 5 mm) forward of the bezel 16.

The side plates 34a, 34b may define a watertight seal with respect to edges of the housing 14, such as by means of a gasket or O-ring interposed between each side plate 34a, 34b and the housing 14. Likewise, edges of one or both of the bezel 16 and transparent layer 20 may define watertight seals with respect to the side plats 34a, 34b, such as by means of a gasket or O-ring interposed between each edge and the side plate 34a, 34b interfacing with it.

In some embodiments, a rib 36 extends rearwardly from a rear wall of the housing, i.e., opposite from the front surface to which the bezel 16 and transparent layer 20 are secured. In the illustrated embodiment, the rib 36 extends rearwardly along the longitudinal direction 12c and along the housing 14 in the horizontal direction 12b. The rib 36 may be a tapered fin having substantially (e.g., within 1 to 3 mm) constant cross section along the horizontal direction 12b in a plane perpendicular to the horizontal direction, with the thickness in the vertical direction 12a becoming smaller with distance from the housing 14.

Fins 38 may protrude from the rib 36, such as both above and below the rib 36. For example, the fins 38 may be fins having substantially constant cross section in the vertical-longitudinal plane and may taper with distance from the rib 36. The fins 38 may be angled in the vertical-longitudinal plane, i.e., a center plane of each fin may define an angle of between 60 and 80 degrees with respect to the surface of the rib 36 from which it protrudes. The fins 38 may be angled away from the housing 14, i.e., become farther away from the housing 14 with distance from the rib 36.

In some embodiments, fins 38 are formed on the top and bottom of the housing 14, The center planes of the fins 38 perpendicular to the vertical longitudinal plane may be substantially parallel to the center planes of the fins 36. As is apparent in FIG. 1, the tips of the fins 38, 36 may lie on a curved contour that slopes downwardly toward the rib with distance from the front of the housing 14 in the vertical-longitudinal plane. Note that in some embodiments, the housing 14, rib 36, and fins 38, 40 may all be formed of metal, such as aluminum, and formed as a single extrusion. Other parts of the light 10, such as the bezel 16 may also be formed of a metal such as aluminum.

In some embodiments, the side plates 34a, 34b may define openings 42 to promote air flow over the rib 36 and fins 38. As is apparent, the opening 42 may be positioned rearward of a rear wall of the housing 14 such that it does not interfere with the side plates 34a, 34b covering the sides of the housing 14. As is also apparent portions of the side plates 34a, 34b may extend completely round the opening 42 in order to cover edges of the fins 38, which may be sharp or easily damaged.

In some embodiments, to facilitate fixing the position of the light 10 relative to the mount 24, the arms 26a, 26b may be provided with extensions 44a, 44b extending from the arms 26a, 26b. The extensions 44a, 44b may be formed monolithically with the arms 26a, 26b, i.e., from the same sheet of metal. The extensions 44a, 44b extend rearwardly from the arms 26a, 26b and engage a structure fastened to the rib 36 at various orientations of the extensions 44a, 44b relative to the housing 14, rib 36, and side plates 34a, 34b.

For example, in some embodiments, an arcuate slot 46 may be defined in each extension 44a, 44b and have a radius of curvature that is substantially (e.g., within 1 to 3 mm) centered on the pivots 30a, 30b, respectively. Pivots 50a, 50b protrude outwardly from the side plates 34a, 34b and are secured to either the side plates 34a, 34b or the rib 36. The pivots 50a, 50b extend through the arcuate slots 46 of the extensions 44a, 44b and are selectively securable relative the slots 46. For example, the pivots 50a, 50b may be bolts that may be threaded into apertures formed in the side plates 34a, 34b or rib 36. Prior to tightening the bolts, the housing 14 may be rotated relative to the mount 14 to a desired position. The bolts may then be tightened in order to clamp the extensions 44a, 44b between the head of the bolt and the side plates 34a, 34b and hinder change in the orientation of the light 10 relative to the mount 24.

In the illustrated embodiment, a slot or aperture 50 is defined in each extension 44a, 44b and overlaps the opening 42 in the side plate 34a, 34b, respectively in the vertical and longitudinal directions in order to facilitate airflow through the openings 42 and over the fins 38.

Referring to FIGS. 5A to 5E, the housing 14 may contain an array of light emitters 52a-52f. The array of light emitters 52a-52f may be distributed along the horizontal direction 12b. In the illustrated embodiments, there are six light emitters. However, any number of light emitters may be used, such as from 1 to 12 light emitters. As is apparent in FIG. 5A, the light emitters 52a-52f may sit at the base of reflectors 54a-54f, respectively. The reflectors 54a-54f may be parabolic reflectors. As is also apparent in FIG. 5A, the opening 18 in the bezel 16 may be scalloped or define arcuate portions that are substantially (e.g., within 1 to 4 mm) concentric with the reflectors 54a-54f. In other embodiments, total internal reflection (TIR) optics are used to direct light from the light emitters 52a-52f rather than parabolic reflectors.

The light emitters 52a-52f may include light emitting diodes (LEDs), lasers, halogen lamps, incandescent lamps, or any other type of light emitter. The light emitters 52a-52f may be all be of the same type or may include light emitters of different types. The presence of multiple light emitters may enable a single light 10 to have multiple light emitting properties, i.e., output both focused and diffuse beams of light. This may be achieved by providing different types of emitters.

Figure 5A:
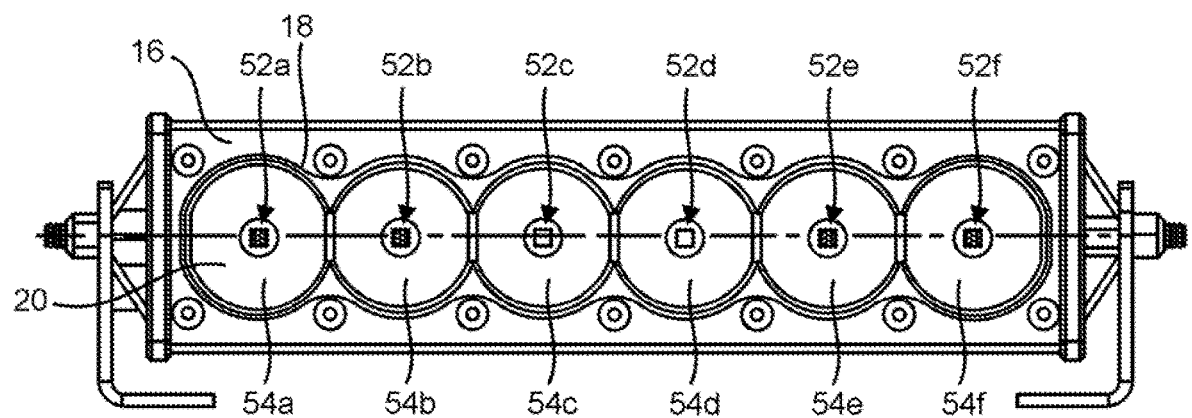
FIGS. 5A to 5E are front views of various configurations of the auxiliary light of FIG. 1.
Figure 5B:
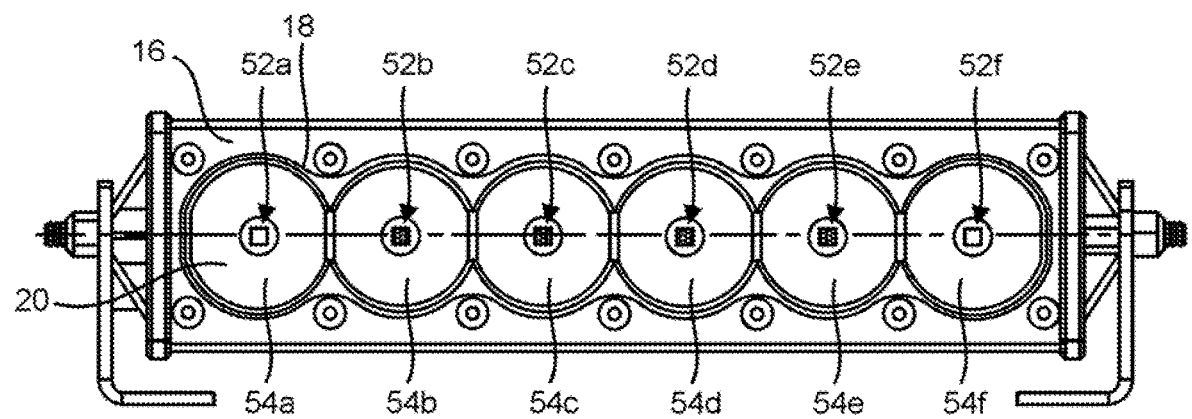
Figure 5C:
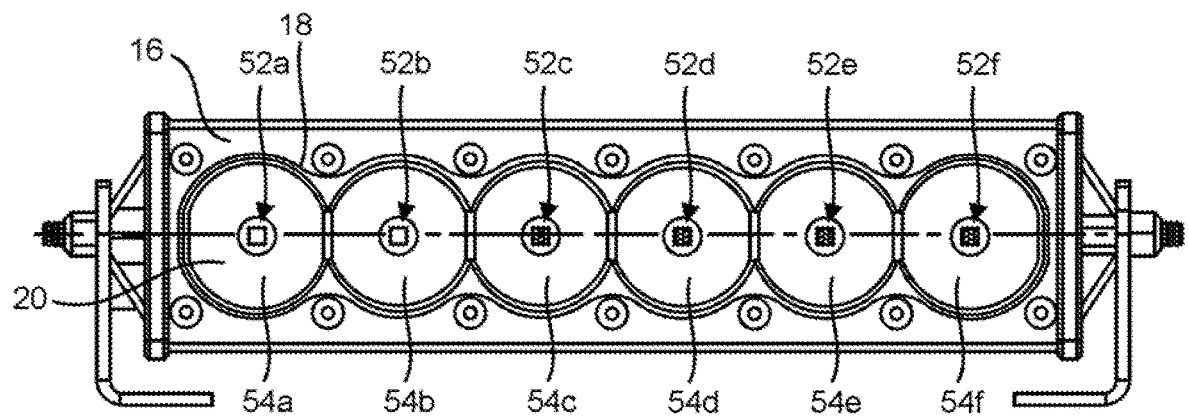

For example, in FIG. 5A, the outboard pairs of light emitters 52a, 52b, 52e, 52f are LEDs whereas the central pair of light emitters 52c, 52d are lasers. In FIG. 5B, the outboard light emitters 52a, 52f are lasers whereas the four inboard light emitters 52b-52e are all LEDs. In FIG. 5C, the rightmost pair of light emitters 52a, 52b are lasers whereas the remaining light emitters 52c-52f are all LEDs.

Different combinations of light emitting properties may also be achieved by using a transparent layer 20 with different properties over different light emitters 52a-52f. The differing properties in different regions of the transparent layer 20 may be combined with differing the types of the light emitters 52a-52f. In some embodiments, the light 10 may be sold with multiple transparent layers 20 with different combinations of regions with different properties to enable the user to alter the properties of the light 10.

Figure 5D:
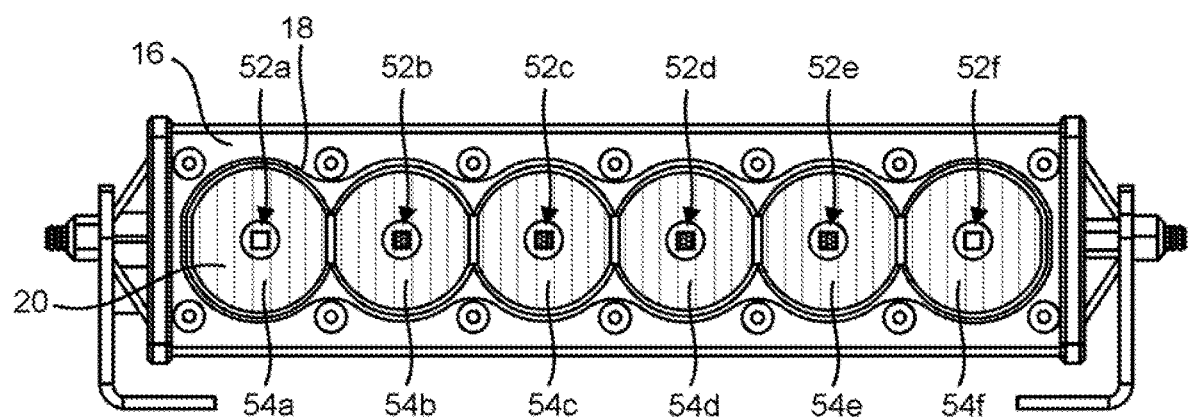
Figure 5E:
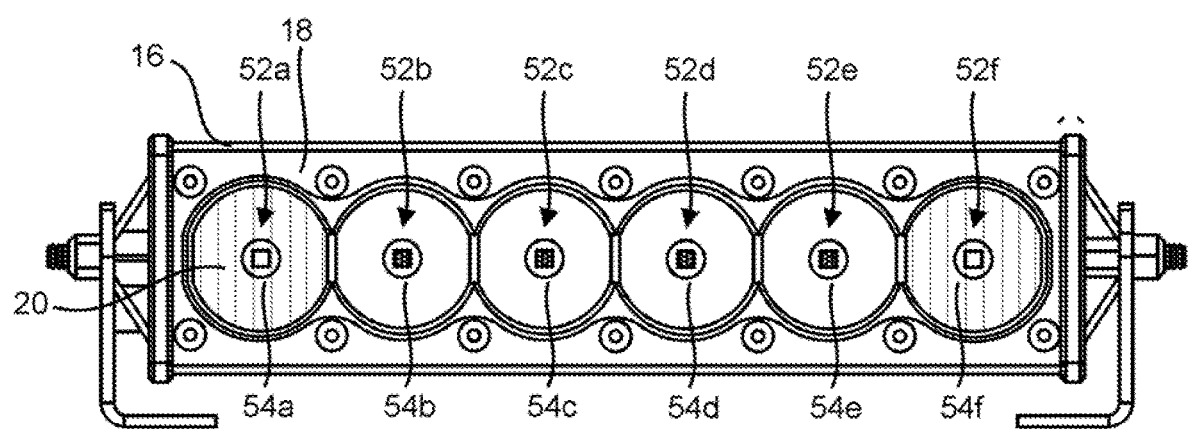

For example, FIGS. 5A to 5C all show transparent layers 20 that are simply transparent. FIG. 5D illustrates a transparent layer 20 that is machined in each region over each light emitter 52a-52f to function as a lens that either focuses or diffuses light from the light emitter 52a-52f. FIG. 5E shows the same configuration of light emitters as FIG. 5B that additionally includes lenses formed in regions of the transparent layer 20 over the outboard light emitters 52a, 52f but planar transparent regions over the inboard light emitters 52b-52e. The lenses formed over light emitters 52a, 52f may either focus or diffuse light passing therethrough.

The configuration of the types and arrangement of light emitters and the types and configurations of regions of the transparent layer 20 may be arranged to provide a desired ratio of forward (along longitudinal direction 12c) and side illumination by the light 10.

The configurations of FIGS. 5D and 5E are exemplary only. A manufacturer may have any combination and arrangement of light emitters 52a-52f and any number of transparent layers with any combination of regions (planar, diffusing lens, focusing lens) over the light emitters 52a-52f in order to achieve desired light-emitting properties for the light 10.

Figure 6:
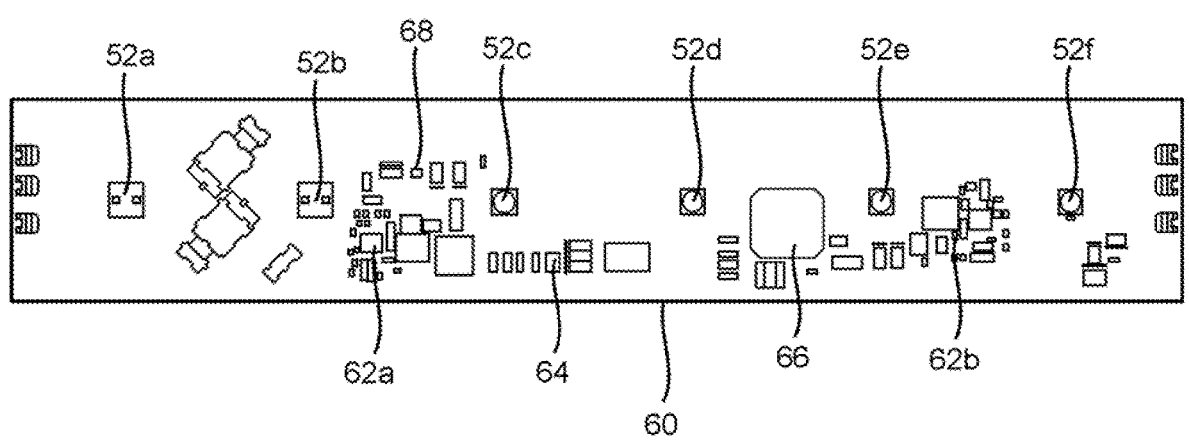
FIG. 6 is a top view of a control circuit for the auxiliary light of FIGURE

Referring to FIG. 6, a circuit board 60 may have the light emitters 52a-52f mounted to a surface thereof along with circuits for providing power from to the light emitters 52a-52f, such as power from a power supply chord (not shown) extending into the housing 14 and coupled to the circuit board 60. The circuit board 60 may be positioned within the housing behind the reflectors 54a-54f.

The circuits of the circuit board 60 may include one or more drive circuits 62a, 62b. For example, one drive circuit 62a may provide power to a first type of light emitter 52a-52f and a second driver circuit 62b may provide power to a second type of light emitter 52a-52f. The circuits may include various electrical components including capacitors 64, inductors 66, and resistors 68 in order to transform power from a power supply into a voltage suitable for the light emitters 52a, 52f. Additional components on the circuit board 60 may include switches (e.g., metal oxide semiconductor field effect transistor (MOSFET) switches), integrated circuits, or the like.

In some embodiments, the circuits of the circuit board 60 receives a voltage of between 9 and 36 Volts and transforms this voltage to be suitable for driving the light emitters 52a-52f and supply power at the rate of between 8 and 20 Watts per light emitter 52a-52f.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:
1. An apparatus comprising:
an auxiliary light including:
  a housing defining a front opening extending in a horizontal direction and a vertical direction perpendicular to the horizontal direction;
  a light emitting device mounted in the housing;
  a transparent cover mounted over the front opening;
  a rib extending rearwardly from the housing opposite the front opening; and
  a plurality of fins mounted on the rib;

wherein the auxiliary light includes a plurality of light emitters distributed along the horizontal direction, the light emitting device being one of the plurality of light emitters; and wherein the plurality of light emitters include one or more lasers and one or more light emitting diodes.

2. An apparatus of claim 1, wherein:

the rib is oriented substantially parallel to the horizontal direction and a longitudinal direction parallel to the horizontal direction; and the plurality of fins are mounted to the rib extending along the rib substantially parallel to the horizontal direction.

3. The apparatus of claim 2, wherein the plurality of fins are angled and extend away from the housing in a plane parallel to the horizontal direction and a vertical direction perpendicular to the horizontal direction and the longitudinal direction.

4. The apparatus of claim 2, wherein the plurality of fins include first fins positioned on a first side of the rib and second fins positioned on a second side of the rib.

5. The apparatus of claim 4, wherein the housing further includes third fins positioned on a top of the housing and fourth fins positioned on a bottom of the housing.

6. The apparatus of claim 1, further comprising a mount having a first arm pivotally secured to a first pivot on a first side of the housing and a second arm pivotally secured to a second pivot on a second side of the housing opposite the first side, the first pivot and the second pivot defining an axis of rotation substantially parallel to the horizontal direction.

7. The apparatus of claim 6, further comprising:

a first extension on the first arm and extending rearwardly from the first arm;

a second extension on the second arm and extending rearwardly from the second arm;

wherein a distal end of the first arm is selectively securable to a distal end of the rib at a plurality of orientations of the rib; and wherein a distal end of the second arm is selectively securable to the distal end of the rib at the plurality of orientations of the rib.

8. The apparatus of claim 7, wherein:

the distal end of the first arm defines a first arcuate slot;

the distal end of the second arm defines a second arcuate slot;

a first protuberance extends from the first side of the housing and into the first arcuate slot; and a second protuberance extends from the second side of the housing and into the second arcuate slot.

9. The apparatus of claim 7, wherein:

the first side defines a first opening extending along the rib and the plurality of fins;

the second side defines a second opening extending along the rib and the plurality of fins;

the first extension defines a third opening overlapping the first opening; and the second extension defines a fourth opening overlapping the second opening.

10. The apparatus of claim 1, wherein:

a first side of the housing defines a first opening extending along the rib and the plurality of fins; and a second side of the housing defines a second opening extending along the rib and the plurality of fins.

11. The apparatus of claim 1, wherein the transparent cover extends across all of the plurality of light emitters in the horizontal direction.

12. The apparatus of claim 11, wherein the transparent cover contains regions with different optical properties positioned over different light emitters of the plurality of light emitters along the horizontal direction.

13. The apparatus of claim 11, wherein the different optical properties comprise different degrees of spreading of light from the different light emitters.

14. The apparatus of claim 1, further comprising a bezel secured to the housing, the transparent cover being positioned between the bezel and the housing.

15. An apparatus comprising:

an auxiliary light including:

a housing defining a front opening extending in a horizontal direction and a vertical direction perpendicular to the horizontal direction;

a light emitting device mounted in the housing;

a transparent cover mounted over the front opening;

a rib extending rearwardly from the housing opposite the front opening; and a plurality of fins mounted on the rib and extending outwardly from top and bottom surfaces of the rib; and a mount having a first arm pivotally secured to a first pivot on a first side of the housing and a second arm pivotally secured to a second pivot on a second side of the housing opposite the first side, the first pivot and the second pivot defining an axis of rotation substantially parallel to the horizontal direction;

wherein the auxiliary light includes a plurality of light emitters distributed along the horizontal direction, the light emitting device being one of the plurality of light emitters; and wherein the plurality of light emitters include one or more lasers and one or more light emitting diodes.

16. The apparatus of claim 15, wherein:

the rib is oriented substantially parallel to the horizontal direction and a longitudinal direction parallel to the horizontal direction;

the plurality of fins are mounted to the rib extending along the rib substantially parallel to the horizontal direction;

the plurality of fins are angled and extend away from the housing in a plane parallel to the horizontal direction and a vertical direction perpendicular to the horizontal direction and the longitudinal direction; and the plurality of fins include first fins positioned on a first side of the rib and second fins positioned on a second side of the rib.

17. The apparatus of claim 16, further comprising:

a first extension on the first arm and extending rearwardly from the first arm;

a second extension on the second arm and extending rearwardly from the second arm;

wherein a distal end of the first arm is selectively securable to a distal end of the rib at a plurality of orientations of the rib; and wherein a distal end of the second arm is selectively securable to the distal end of the rib at the plurality of orientations of the rib.

18. The apparatus of claim 17, wherein:

the first side defines a first opening extending along the rib and the plurality of fins;

the second side defines a second opening extending along the rib and the plurality of fins;

the first extension defines a third opening overlapping the first opening; and the second extension defines a fourth opening overlapping the second opening.

* * * * *

UNITED STATES PATENT AND TRADEMARK OFFICE
CERTIFICATE OF CORRECTION

PATENT NO. : 10,641,472 B1
APPLICATION NO. : 16/664759
DATED : May 5, 2020
INVENTOR(S) : Christopher Johnson Page 1 of 1

It is certified that error appears in the above-identified patent and that said Letters Patent is hereby corrected as shown below:

In the Claims

In Column 8, Line 3 (Claim 13), "11" should be --12--.

Signed and Sealed this
Sixteenth Day of June, 2020

Andrei Iancu
*Director of the United States Patent and Trademark Office*